(No Model.)
C. E. DURYEA.
VEHICLE TIRE.
No. 578,551. Patented Mar. 9, 1897.
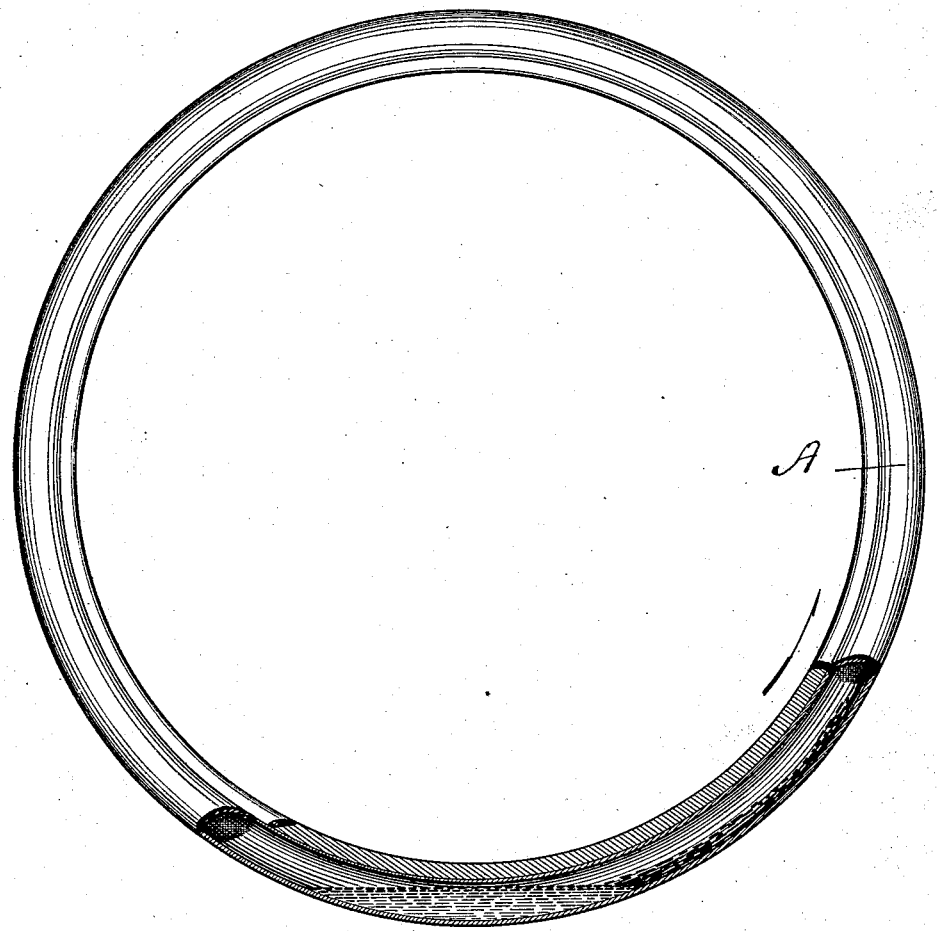
Witnesses
Inventor
C. E. Duryea
Attorney

UNITED STATES PATENT OFFICE.

CHARLES E. DURYEA, OF PEORIA, ILLINOIS, ASSIGNOR TO THE INDIANA RUBBER AND INSULATED WIRE COMPANY, OF MARION, INDIANA.

VEHICLE-TIRE.

SPECIFICATION forming part of Letters Patent No. 578,551, dated March 9, 1897.

Original application filed December 28, 1891, Serial No. 416,308. Divided and this application filed June 8, 1896. Serial No. 594,734. (No model.)

*To all whom it may concern:*

Be it known that I, CHARLES E. DURYEA, of Peoria, in the county of Peoria and State of Illinois, have invented new and useful Improvements in Vehicle-Tires, of which the following, taken in connection with the accompanying drawing, is a specification.

This application is filed as a division under the requirements of the examiner of the application filed by me on or about the 28th day of December, 1891, Serial No. 416,308.

The invention forming the subject-matter of this divisional application relates to pneumatic tires for vehicle-wheels, the object of the invention being to render tires self-healing—that is to say, adapted to automatically close a puncture.

With this object in view the invention consists in the matters to be hereinafter described in detail and then briefly stated in the claims at the close of this specification.

In the accompanying drawing I have illustrated by sectional view a tire embodying my invention.

For the purposes of my present invention I provide within the interior of the air-containing tube (whether of the single or double tube type) a free-flowing liquid or semiliquid sealing agent or cement, so that upon puncture the escaping air will force said agent or cement into the aperture or wound in the tire, thereby closing or healing the same, to prevent the further escape of air confined therein. The tire or tire-cover A is to be molded preferably, though not essentially, in endless form.

The liquid or semiliquid substance is employed as a self-healing agent designed to automatically close or heal a leak or puncture in a tire, and it is evident that it may be applied to tires or air-tubes at any time—that is to say, that a new tire may be provided interiorly with said self-sealing agent or that it may be injected therein after the tire has been in use, the self-sealing agent serving the same purpose in any case.

In carrying out my invention I coat the inner surface of the air-containing tube of a tire or inject therein a liquid gum or gummy compound or liquid, preferably of about the consistency of molasses and having the property of remaining fluid when exposed to the air contained in the air-tube, but to harden upon exposure in small quantities to the outer air. This gummy fluid is designed to be constantly redistributed over the inner surface of the air-containing tube by the change in position or rotation of the wheel to which the tire is applied, a thin film thereof being present in all portions of the tube, but in greater body or bulk in that portion of said tube adjacent to the tread of the tire, owing to centrifugal conditions, so that when the tire is punctured the fluid will be forced into or through the aperture or puncture by the outward pressure of air or escape of air from the tire through the puncture and by filling or partly filling said aperture or puncture retard or entirely prevent the escape of air contained within the tire according as the puncture is large or small.

Among the liquids, gums, or compounds which have been used with greater or less success, experimentally, by me I will mention thin liquid glue or thick mucilage, combined with sufficient glycerin to insure said glue or mucilage remaining fluid when exposed to the air contained within the tire. I have also successfully closed leaks or punctures by the use of flour within the air-tube, the same being normally dry, but converted into a paste (when needed) by the injection into the air-tube of a small quantity of water. I do not, however, confine myself to any specific liquid, compound, or substance, since the principle of my invention remains the same, irrespective of the particular substance found to be best suited to the stated requirements—namely, a liquid or semiliquid which will retain its free-flowing characteristics while contained within the tire, but which will preferably harden or become more dense when exposed to the outer atmosphere.

While I have described an air-tube provided with an interior coating or lining of gummy liquid, it will be understood that the use of other substances not normally a gummy liquid in this connection will be advantageous, as, for instance, a fine powder, such as flour, may be contained within the air-tube normally, which may be instantly converted into a liquid gum or paste when required by the injection into the air-tube of water or other appropriate liquid.

I claim—

1. A pneumatic tire provided with a semi-liquid or free-flowing sealing agent or cement within its air-chamber, substantially as described.

2. An air-containing tube for pneumatic tires provided interiorly with a gummy liquid designed to flow within said tube, substantially as described.

3. The combination with the air-containing tube of pneumatic tires, of a gummy liquid contained therein and designed by redistribution due to movement of the tube to form an interior liquid coating adapted to be forced by escaping air into leaks or apertures in said air-containing tube, substantially as described.

4. The combination with the air-containing tube of pneumatic tires of a foreign substance contained therein and adapted to be converted into a gummy liquid to heal punctures in said tube, substantially as described.

5. A pneumatic tire provided within its air-chamber with a free semiliquid substance adapted to coagulate when exposed to the external atmosphere to seal a puncture or vent in the tire, substantially as described.

6. A pneumatic tire having within its air-chamber a free liquid cement or sealing agent constituents of which will evaporate when exposed to the outer air, substantially as described.

7. A pneumatic tire having within its air-chamber a cement or sealing agent which remains normally in a liquid state, but which hardens or coagulates when exposed to the outer air, to effect the sealing of a vent or fissure in the tire, substantially as described.

In testimony whereof I have signed my name to this specification, in the presence of two subscribing witnesses, on this 1st day of June, A. D. 1896.

CHARLES E. DURYEA.

Witnesses:
C. A. NEALE,
K. H. BANKS.